July 29, 1952    G. P. BOSOMWORTH ET AL    2,604,665
ELECTRONIC CURING OF SPONGE RUBBER
Filed April 14, 1947

INVENTORS
GEORGE P. BOSOMWORTH
AND
FRED H. MASON
BY
ATTORNEYS

Patented July 29, 1952

2,604,665

UNITED STATES PATENT OFFICE 2,604,665

ELECTRONIC CURING OF SPONGE RUBBER

George P. Bosomworth and Fred H. Mason, Akron, Ohio, assignors to The Firestone Tire & Rubber Company, Akron, Ohio, a corporation of Ohio Application April 14, 1947, Serial No. 741,208

4 Claims. (Cl. 18—53)

This invention relates to an improved process for treating or fabricating cellular articles made from aqueous dispersions of rubber or rubber-like compositions.

Heretofore, cellular or sponge rubber articles made of plastics, rubber and synthetic rubber attained great popularity as a desirable material for use in automobile, airplane and furniture upholstery in mattresses and as cushioning and insulating materials in many other diverse applications. Such material, when first used, was incorporated into relatively small articles, but as technical advances were made the manufacture of larger articles was constantly attempted.

The problems of curing relating to these foamed or cellular articles have been intensified by the gradual increase in the size and complexity of designs. In large articles, such as mattresses, uniformity of cure, the length of the cure period and equipment suitable for curing are some of the factors causing the greatest difficulty. The methods in use prior to our invention effect curing by surrounding the uncured article, which is usually enclosed in a mold, with a heating medium such as steam or water. The curing process depended upon the slow transfer of heat inwardly through the wet cellular rubber in order to raise the temperature of the entire mass of the material and to cause vulcanization thereof. In such articles the curing progresses as the heat is conducted from the outer surface to the innermost portions of the article. In large articles these interior portions never quite attain, during ordinary cycles, the temperature existing at the outer surface of the article. Consequently, the outer portions become overcured while the innermost portions remain undercured. Also in articles of irregular shapes where cross sections vary greatly between the exteriorly heated surfaces, uniform curing is practically impossible. This lack of uniformity, whether it be undercured or overcured, results in finished products which do not retain their original shape or give the length of service for which they were intended.

Prior to this invention, in processes for fabricating cellular articles, the mold containing the composition to be cured was heated in steam chambers operated at atmospheric pressure or pressures greater than atmospheric. Where a continuous type process is desired or where long curing cycles and the use of extensive floor space are not objectionable, curing at atmospheric pressure is preferable. However, when curing at atmospheric pressure, the curing cycle must be increased resulting in increased cost. The curing cycle can be reduced somewhat within narrow limits by using pressure equipment. Pressure equipment, however, renders impracticable continuous process operations and requires increased floor space. It is, therefore, obvious that the curing operation of cellular materials by previous methods entails considerable expense which materially affects, or even controls, the marketability of these materials as against competing products.

It is an object of this invention to provide an improved process for curing cellular objects uniformly regardless of the size or shape. Another object is to provide a curing process which utilizes equipment mechanically simple to operate and having reduced spacial requirements and which is well adapted to continuous process operation. A further object is substantially to reduce curing time heretofore necessary in the usual processes without increasing the danger of undercuring. It is also an object to provide an apparatus whereby cellular articles may be efficiently cured according to the aforementioned objects. Still another object is to provide uniformly cured, homogeneous, porous or cellular articles of desired shape. Other and further objects will appear as the invention is described with reference to the accompanying drawings, in which:

Figure 1:
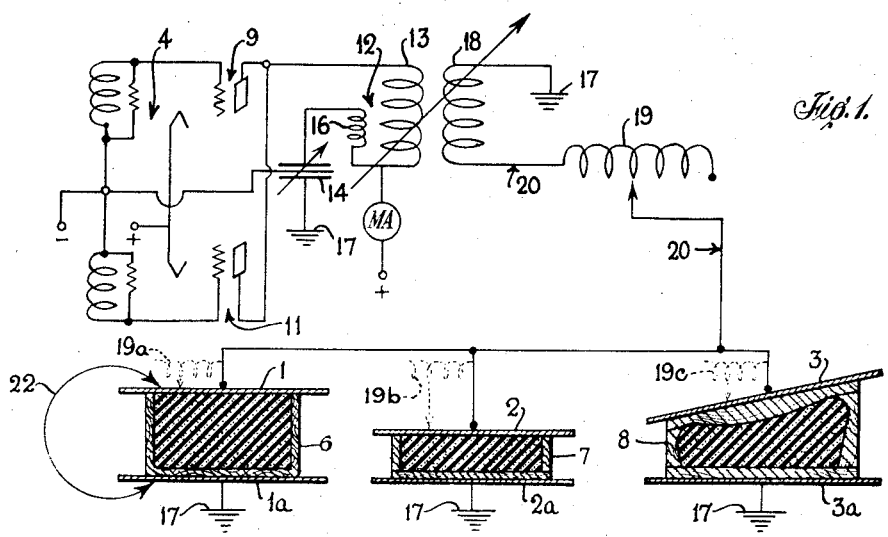
Fig. 1 is a schematic illustration of an adaptation of this invention for simultaneous treatment or fabrication of a plurality of articles of different sizes and shapes.

Broadly speaking, the present invention contemplates the accomplishment of the aforementioned objects by subjecting the raw material to be treated to the influence of a high-frequency electrical field for the purpose of converting the composition to rubber or rubber-like material. The invention is applicable to aqueous dispersions of any rubber, rubber-like material, synthetic resins or the like, which dispersions may be foamed, molded in the desired shape and gelled. The aqueous constituents may include a liquid or liquids, the boiling points of which are in the curing temperature range of the material. Any stable dispersion of these materials including compatible pigments common in rubber and plastic compounding practice, such as accelerators, carbon black, sulfur, softeners, antioxidants, gelling agents and the like, may be molded, foamed and gelled to form articles suitable for treatment with high-frequency electrical energy. Gelling of the above indicated materials proceeds by chemical action of the gelling agent, as is well known in the art, and may be expedited by subjecting the materials to the influence of an electrical field, as will be hereinafter described.

According to one embodiment of the invention, the mold containing the wet gelled or partially gelled rubber or rubber-like composition is placed between two opposed plates which are energized by high-frequency electrical energy. The resulting arrangement is analogous to that of a condenser in which the uncured material and the mold constitute the dielectric. It is advisable, in employing the invention, to use a material for the mold which has dielectric characteristics such as to ensure uniform heating of the rubber compositions and the mold during treatment by high-frequency electrical energy. The desired properties of a mold material may be found in wood, porcelain, glass, and other non-conducting material. A suitable choice of material should be made so that the combined effects of the electrical and thermo characteristics will result in approximately the same temperature rise in both the product and the mold during processing.

However, where the mold material is relatively thin and possesses low heat capacity and heat conductivity, it may readily be less susceptible to heating by the high frequency current than the uncured cellular material. When mold materials of high heat capacity and conductivity are used, in the thick sections any appreciable temperature difference between the mold and the contents is reflected in overcuring or undercuring in portions of the molded object adjacent the mold. The mold is preferably perforated with small holes of the order of one-fourth of an inch in diameter in all sides and the top and bottom to permit vapor to escape. It has been discovered that fluid, ungelled, foamed material may be readily poured into molds of this type without loss of material through the perforations.

Since an appreciable amount of liquid is contained in the foamed material, the presence of this liquid in the uncured porous material not only provides more satisfactory dielectric properties but also serves as an excellent temperature controller. For example, excellent curing of sponge rubber is obtained with water at atmospheric pressure. During the heating produced by the high frequency energy, vapor is formed throughout the interior of the sponge-like body and is discharged through the perforations in the mold. The temperature of the material being treated remains uniform throughout the volume of the material at the boiling point of the liquid for the duration of the cure period.

In case an increase or decrease in curing temperature is desired, the boiling point of the dispersing liquid may be varied or the curing apparatus, i. e., the electrodes and the molds and the material to be treated may be enclosed in a suitable pressure or vacuum chamber. In aqueous rubber dispersions or latices which have been modified to cure at lower temperatures, the boiling point may be lowered by the addition of water soluble organic liquids having boiling points lower than the boiling point of water, such as acetone, methyl alcohol, ethyl alcohol, or iso-propyl alcohol, when suitable emulsion stabilizing agents are present in sufficient quantity to prevent premature coagulation of the dispersion. Similarly, the boiling point may be raised by adding to the dispersion in the presence of a suitable dispersion stabilizer, sugar, glycols or amino acids. Under prolonged vaporization, the boiling point could be expected to change, in the presence of boiling point depressants or elevators, but since some liquid is vaporized in the time required for curing in the practice of this invention, a small change in boiling point may occur. After curing, washing with water is recommended to remove the above named boiling point depressants or elevators as well as the residual materials of the original latex remaining in the pores of the cellular structure.

According to the embodiment of the invention shown in Fig. 1, a conventional radio frequency dielectric heating system is provided comprising pairs of spaced electrodes or treating plates 1, 1a, 2, 2a, 3, 3a between which the material to be treated or fabricated is placed, and a source of high frequency energy, shown as a conventional oscillator or generator 4 for energizing the aforesaid plates. The rubber or rubber-like composition to be treated and from which the articles are made, is contained in suitable dielectric molds 6, 7 and 8 so that the molds and the material contained therein, in effect, serve as the dielectrics of condensers of which the electrodes act as plates.

The high frequency generator or oscillator 4 is of conventional arrangement and comprises two electron discharge tubes 9 and 11, the plates of which are connected in parallel to a tuned oscillator or tank circuit 12 including tank coil 13, variable condenser 14 and grid feedback coil 16. As shown, all the circuits are returned through ground indicated by numeral 17. The tank coil 13 is inductively coupled to an output coupling coil 18, which is part of a work or load circuit 20 including an auxiliary loading coil 19 and the electrodes or treating plates 1, 1a, 2, 2a and 3, 3a. If desired, additional loading coils 19a, 19b and 19c may be connected in such a way that standing waves on the treating plates are prevented. It will be noted that the treating plates are connected in parallel and constitute parallel branches in the common load circuit.

The oscillator 4 is designed to operate at a frequency within the range of frequencies above supersonic and including those frequencies which give rise to electromagnetic waves having quasi-optical properties. At the upper range of these frequencies, the capacity of the condenser formed by the sets of plates in the different branches of the load circuit may be so large that it is necessary to connect an inductive reactance loop across the plates in order to neutralize a part of the capacitive reactance. Such an inductive loop 22 is shown as connected across plates 1, 1a for illustrative purposes. It will be understood that similar inductances may be connected across the other pairs of plates, if necessary. Preferably the value of the total reactance of each branch circuit is adjusted so that the power in the work circuit 20 will be divided between the branches substantially in proportion to the volume of the material under treatment so that all the material will be treated at substantially the same rate. Also, the reactance loop 22 will prevent standing waves on the plates 1, 1a and thereby insure a substantially uniform electrical field between the plates.

It has been discovered that regardless of the shape of the article being cured or the number of molds of various shapes connected to a single high frequency generator, all the articles may be safely cured simultaneously. In an article of irregular shape, such as that in mold 8, Fig. 1, the thinner portions are cured first. The dielectric properties of the composition change as the cure progresses so that when the composition is completely cured, the heating action decreases to the extent that substantially no further heating takes place in the cured sections while the heating action continues in the uncured sections until the latter are cured. This desirable result is obtained in a single irregularly shaped article, or several articles of varying sizes and shapes placed between a plurality of separate sets of electrodes connected in parallel to a common source of high frequency energy as shown in Figure 1.

Figure 2:
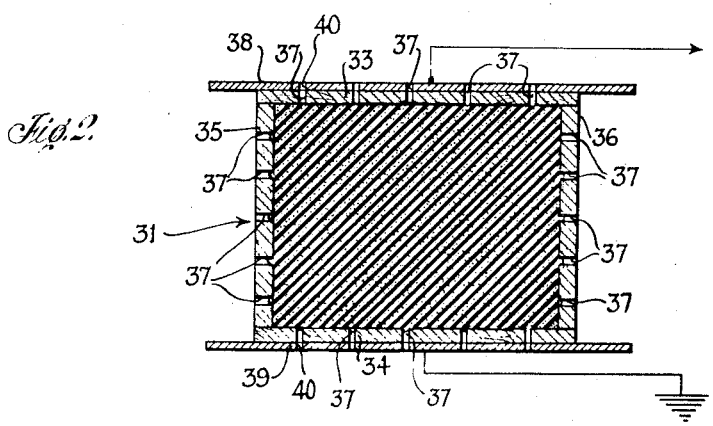
Fig. 2 is an enlarged sectional view of one of the molds and articles under treatment illustrated in Fig. 1.

Figure 2 illustrates the details of a mold typical of the construction of those referred to in connection with Fig. 1. The untreated rubber composition to be treated is contained in the mold 31 including a top 33 and bottom 34 thereof. The sides 35 and 36 and the top 33 and bottom 34 are perforated with small holes 37, preferably not over about ¼" in diameter and numerous enough to permit vapor to escape readily. In the arrangement of Fig. 2, the electrodes or treating plates 38 and 39, which are suitably energized with high frequency electrical energy, are shown as being placed in contact with the top 33 and bottom 34, although, if desired, these plates may be spaced therefrom a reasonable amount so long as the spacing is not so great as to adversely affect the uniform field distribution. These electrodes have holes 40 aligned with holes 37 through the top and bottom portions of the mold.

Figure 3:
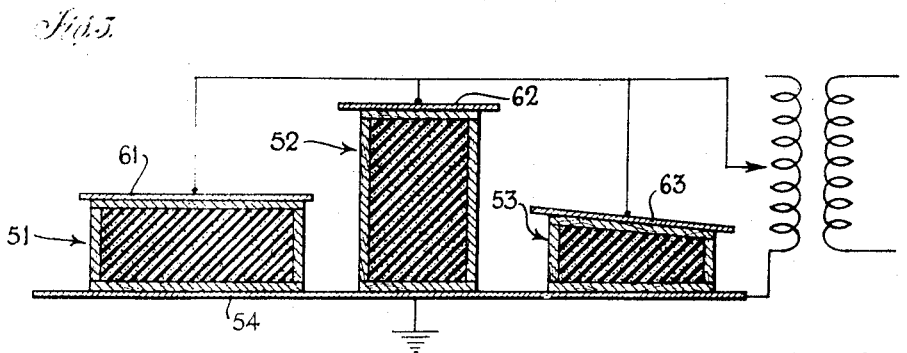
Fig. 3 is a modified form of the invention shown in Fig. 2.

Fig. 3 shows an alternative arrangement in which three molds 51, 52, and 53 of varying size and shape and containing rubber composition are treated simultaneously with power furnished from a single high frequency generator. In this arrangement, a common electrode 54 is placed on the bottom side of all three molds while separate electrodes 61, 62 and 63 are placed at the tops of the molds 51, 52 and 53, respectively.

As previously indicated, it is not necessary that the distance between all portions of the treating plates be uniform in order to obtain satisfactory uniform cure. It follows, therefore, that when irregularly shaped objects, such as the article in mold 8 of Figure 1, or when objects of different dimensions are treated between respective sets of treating plates connected to a common source of high frequency electrical energy, it is not necessary that special precautions be taken to produce exactly uniform distribution of the electrical field throughout the space occupied by the material under treatment provided the composition contains sufficient liquid constituents having a boiling point within curing temperature range of the composition. For instance, if the heating action is greater in the left side of the article in mold 8, Fig. 1, because the plates 3, 3a are closer together on that side, or if the heating action is greater in the article in mold 7 than in the article in mold 6 because plates 2, 2a are closer together than the plates 1, 1a, as the state of cure of one article advances ahead of the state of cure of another portion of the article or of another article in another mold, the heating action will automatically decrease in the regions of advanced cure. If the boiling point of the liquid constituents is within the curing temperature range, a substantially uniform cure will be effected. The high frequency treatment cooperates with the thermal characteristics of the liquid constituents of the composition to produce a uniform cure throughout the entire mass of the composition. This action is accomplished in a shorter length of time and with greater uniformity than was possible with methods heretofore used.

In the practice of this invention, a suitable sponge rubber composition is made by the following method. To 25 parts of a concentrated natural rubber latex of 58% rubber content, there is added with stirring 0.65 part of a 50% water dispersion of sulfur and 0.13 part of a 50% water dispersion of zinc diethyldithiocarbamate. The ammonia content of this mixture is reduced to 0.25% ± 0.02% by agitating the mixture slowly for 24 hours at 100° F. and allowing an air current to pass over the surface of the mixture. Thereafter 0.43 part of a zinc salt of mercaptobenzothiazole is uniformly mixed with the latex and the latter is allowed to stand for 12 hours. The resulting mixture, which may be called the "masterbatch" is cooled to 55° F. and held at that temperature until needed for incorporation into the final frothed latex formula.

A portion of the above described masterbatch (1.09 pounds) is stirred and the following ingredients are uniformly mixed therewith in the order they are named: 0.0445 pound of a 6.05% solution of piperidinium pentamethylene-dithiocarbamate, 0.0166 pound of a 35% solution of the potassium soap of castor oil, and 0.0580 pound of a 10% solution of potassium oleate. The resulting mixture is beaten vigorously to form a froth, and the beating is continued to expand the froth to a density suitable for molding.

Near the end of the beating operation gelling agents are added. The first gelling agent is a previously prepared 40% aqueous dispersion of zinc oxide. A portion (0.0680 pound) of the zinc oxide dispersion is added during one-quarter minute, and the beating operation is continued for another three-quarter minute during which a small increase in volume occurs. Immediately thereafter 12 ml. of a 25% aqueous solution of sodium silico-fluoride are added during one-quarter minute, and the beating is continued until the volume of a foam decreases to the volume desired for casting in the molds. The foam is then immediately poured into molds, such as those illustrated in the accompanying drawings, and is allowed to stand therein a few minutes, until it has set to a stable porous gel. The molds and the composition contained therein are then subjected to a high frequency electrical field. Vapor is given off during the cure. The temperature of the sponge material remains at 212° F. unless boiling point depressants or elevators have been used. After approximately 5 minutes, the high frequency electrical energy may be turned off and the wet sponge removed. Thereafter, it is washed in water and dried.

While a frequency of approximately 13 megacycles was found quite satisfactory with a generator output of approximately 3 kilowatts per pound, dry sponge basis, other frequencies as low as 2.5 megacycles have been used. Higher frequencies allow the use of lower voltages and are desirable on that account because of lessening the danger from high voltage arcing. In addition to being a fire hazard, arcing is destructive to the material being treated. Higher frequencies are readily applicable but as the frequency is increased, greater power losses must be expected within the generator. The use of higher frequencies is limited only by the efficiency of the generators and the expense of constructing generators capable of such frequencies.

A sponge or cellular article produced in the above described manner is completely and uniformly cured. Unless excessive power is used, there is little danger from overcuring, because the dielectric properties so change during the curing process that at the end of the cure period, the high frequency current exerts but a portion of the heating effect manifested in the uncured composition. Discovery of this principle has made it possible to cure homogeneous sponge or cellular articles containing a fluid, volatile within the curing temperature range of the composition of which the articles are made, with little concern as to the shape or number thereof, so long as they are contained in molds made of similar material and all such molds are subjected to an electrical field of substantially the same intensity. This is considered a great advance over the previous methods of curing, such as applying heat externally through the use of steam. A distinct advantage of the present invention is the great flexibility with which the curing temperature can be changed through the simple expedients of air and steam pressure chambers or boiling point depressants and elevators, without creating the numerous heat transfer problems to which the external steam curing is susceptible.

The term "rubber" as used in the appended claims shall include all vulcanizable compositions which include natural rubber or synthetic rubber. This term as used herein also includes co polymers of the butadiene-styrene type, copolymers of the butadiene-acrylonitrile type, polychlorobutadiene type (neoprene), diolefin isobutylene copolymer type ("Butyl" rubber), polysoprene, and polybutadiene; any other vulcanizable synthetic elastomers are also contemplated.

The term "high frequency electrical field" is used herein to include the electromagnetic component as well as the electrostatic component, which components are inherently associated with electric current and voltage. Also, the term "high frequency" refers to frequencies above supersonic and including radio frequencies which give rise to electromagnetic waves having quasi-optical properties.

Changes obvious to those skilled in the art may be made in details and proportions adopted in the above description, and modification may be resorted to without departing from the spirit or scope of the invention as defined in the appended claims.

What is claimed is:

1. A method of forming cellular rubber articles of irregular shape comprising the steps of dispersing rubber composition in a liquid having a boiling point not less than the upper value of the temperature range of vulcanization of said rubber composition and subjecting said dispersed rubber or rubber composition to the action of high frequency electrical energy of sufficient intensity and for a period of time sufficient to cure said rubber composition, said liquid constituents being maintained in said composition during the curing period.

2. A method of forming cellular rubber articles, regardless of shape, comprising the steps of dispersing rubber material in a liquid having a boiling point not less than the curing temperature of said material, placing said dispersed material intermediate spaced electrodes, and introducing a source of high frequency electrical energy to said electrodes to cause said material to be dielectrically heated for a period of time sufficient to effect curing thereof, said liquid being present in sufficient amounts to maintain a liquid phase throughout said period of time.

3. The method of forming cellular articles of rubber-like material in which a rubber-like froth is cured by the dielectric application of heat, which comprises the steps of preparing an aqueous dispersion of said material having sufficient amounts of liquid to maintain a liquid phase throughout the curing cycle, the liquid phase having a boiling point not less than the curing temperature of said material, subjecting said material including the liquid phase to the action of a high-frequency electrical field to effect changes in the characteristics of said material, and maintaining the pressure constant by permitting the escape of vapor when said liquid evaporates whereby the evaporation of said liquid phase maintains the temperature substantially uniform and constant, the high-frequency electrical field being applied for a period of time sufficient to effect a complete cure throughout said material.

4. The method of controlling the temperature of a material while heating the material by the application of a high-frequency electrical field which comprises mixing with the material prior to the application of said field a liquid having a boiling point at a temperature corresponding to the temperature at which the material is to be maintained constant for a period of time, and applying said high-frequency energy to the mixture until the liquid reaches said boiling point to utilize the latent heat of vaporization of said liquid to prevent further rise in the temperature of said mixture and to maintain the temperature substantially constant during said period of time, said added liquid being sufficient in amount to maintain a liquid phase throughout said period.

GEORGE P. BOSOMWORTH.
FRED H. MASON.

REFERENCES CITED

The following references are of record in the file of this patent:

UNITED STATES PATENTS

| Number | Name | Date |
| --- | --- | --- |
| 2,261,847 | Dufour et al. | Nov. 4, 1941 |
| 2,395,920 | Te Grotenhuis | Mar. 5, 1946 |
| 2,441,548 | Sperry | May 11, 1948 |
| 2,459,225 | Hickok | Jan. 18, 1949 |

FOREIGN PATENTS

| Number | Country | Date |
| --- | --- | --- |
| 477,911 | Great Britain | Jan. 10, 1938 |

OTHER REFERENCES

The Science of Rubber by Memmler, published by Reinhold Publishing Corp., page 90, lines 17 to 24.

Rubber Age. "How High-Frequency Heating Serves the Rubber Industry." Oct. 1945, pages 69 and 70.

Rubber Age. "High Frequency Heating in the Rubber and Allied Industries." July 1946, pages 429–439.